3,260,771
2,4-DIHYDROXY-2'-METHYLBENZOPHENONE AS ULTRAVIOLET ABSORBER FOR AN UNSATURATED ALKYD-STYRENE RESIN MIXTURE
Lester N. Stanley, Delmar, N.Y., assignor to General Aniline & Film Corporation, New York, N.Y., a corporation of Delaware
No Drawing. Filed May 11, 1962, Ser. No. 194,181
1 Claim. (Cl. 260—866)

This invention relates to polyalkylene plastic compositions stabilized against ultraviolet light degradation by means of 2,4-dihydroxy-2'-methylbenzophenone.

It is known that various mono-, di-, tri- and tetrahydroxy benzophenone compounds have been utilized as ultraviolet light absorbing materials and applied to various organic substances which tend to deteriorate by the absorption of ultraviolet light. While many organic substances have been stabilized with such compounds, considerable difficulties have been encountered in their use for the stabilization of certain types of plastics, particularly paints, polyesters, and vinyl type hydrocarbon polymers, e.g. polyethylene, polypropylene, and polystyrene. Such vinyl type hydrocarbon polymers are hereinafter referred to as polyalkylene plastics. For example: During many investigations it was found that 2-hydroxy-4-alkoxybenzophenones, in which the alkoxy group contains 10 or less carbon atoms or 16 or more carbon atoms, were not sufficiently compatible with polyalkylene plastics, particularly polyethylene because of their exudation from the plastic. To cure this deficiency, it was believed that 2,2'-dihydroxy-4-alkoxybenzophenones would be compatible with polyalkylenes and would function as ultraviolet absorbers. In actual trials, however, it was found that such benzophenones were not compatible despite the fact that the alkyl in the alkoxy group contained from 1 to 18 carbon atoms. This was indeed very disappointing, since it has been established by those skilled in the art that the most efficient ultraviolet absorbents are those benzophenones containing a hydroxy group in each of the 2- and 2'-positions. To get at the root of this shortcoming, various 2,2'-dihydroxy-4,4'-dialkoxybenzophenones; 2,2'-4-trihydroxy-4'-alkoxy-benzophenones and 2,2'-4,4'-tetrahydroxybenzophenones, and mixtures thereof were tried but to no avail. Experimental results showed that they bloomed and bled and in fact in many cases caused discoloration when applied to polyethylene and polypropylene plastics.

The only commercially acceptable stabilizers for polyethylene are 2-hydroxy-4-dodecyloxy and 2-hydroxy-4-tetradecyloxy benzophenones. Because of their high price, many attempts have been made to incorporate the common and cheaper ultraviolet absorbing agents of commerce into polyalkylene plastics, but without success. The commercially available polyalkylene plastic compositions such as polyethylene and polypropylene represent a special peculiar problem since many of the common ultraviolet absorbing agents are not compatible therewith, or if compatible, bloom out and as a consequence fail to stabilize. For example, commercially available ultraviolet absorbing agents such as 2,2', 4,4'-tetrahydroxybenzophenone; 2-hydroxy-4-methoxybenzophenone; 2,4-dihydroxybenzophenone; 2,2'-dihydroxy-4,4'-dimethoxybenzophenone and the like are unsatisfactory for incorporation into polyalkylene plastics since many of them are not compatible, or if they are compatible, are compatible only to a limited extent and bloom on standing. In fact, it has been reported (Marlex 50 Technical Bulletin of November 1957) that 2,4-dihydroxybenzophenone in a Marlex 50 type polyethylene composition produces an off-white color of poor oxidative protection. Similar difficulties have been encountered in the stabilization of polyesters.

It is the principal object of the present invention to provide polyester and polyalkylene plastic compositions stabilized against deterioration by the action of ultraviolet light. Other objects and advantages will appear hereinafter.

I have discovered that among the several species of o-hydroxybenzophenones, 2,4-dihydroxy-2'-methylbenzophenone is exceptionally a unique ultraviolet absorbing agent for inhibiting ultraviolet light deterioration in polyesters and in polyalkylene plastic compositions such as polyethylene, polypropylene, polybutene-1, and polystyrene.

The 2,4-dihydroxy-2'-methylbenzophenone has excellent solubility not only in the various polyester and polyalkylene plastic compositions, but also in other systems, as will be pointed out hereinafter, as compared with closely related o-hydroxybenzophenones which are insoluble or incompatible with such compositions and systems. Another unusual feature is that the 2,4-dihydroxy-2'-methylbenzophenone is much lighter in color than the closely related o-hydroxybenzophenone compounds. This is rather unusual and in fact very important, particularly to manufacturers of polyalkylene plastic compositions and polyester dopes. Since starting polyester dopes are inherently slightly yellow, it is undesirable to add another material which would increase its color.

2-hydroxy-4-methoxybenzophenone, which has been widely used in polyester dope and in polystyrene, has the expected yellow coloration of o-hydroxybenzophenone compounds.

2-hydroxy-4-methoxy-2'-methylbenzophenone has an expected yellow coloration similar to that of 2-hydroxy-4-methoxybenzophenone.

The isomeric 2,4-dihydroxy-4'-methylbenzophenone has a very definite yellow coloration.

The isomeric 2,4-dihydroxy-3'-methylbenzophenone not only has a definite yellow coloration, but additionally is much less compatible with polyester dopes and is only slightly soluble in linseed oil.

Whereas 2,4-dihydroxy-2'-methylbenzophenone is practically white or colorless.

The above comparisons are not only obvious visually, but are also supported by their spectro curves. The cutoff (zero absorption) is sharper and farther away from the visible in the case of 2,4-dihydroxy-2'-methylbenzophenone.

Compound: Cutoff wavelength, m$\mu$
(1) 2-hydroxy-4-methoxybenzophenone _____ 396
(2) 2,4-dihydroxy-4'-methylbenzophenone ____ 402
(3) 2,4-dihydroxy-2'-methylbenzophenone ____ 386

Another measure of yellowness (see the book "Perkin Centenary: 100 Years of Synthetic Dyestuffs," article on UV absorbers) is the optical density of a 1% solution in butyl acetate at 420 m$\mu$. Then density of 2,4-dihydroxy-2'-methylbenzophenone at this wavelength is 0.0926 in contrast to the density of 2-hydroxy-4-methoxybenzophenone, which is 0.1580, a difference of 58%. The less the optical density at this wavelength, the less yellowness; thus in this manner it is demonstrated that 2,4-dihydroxy-2'-methylbenzophenone has considerably less color than the related 2-hydroxy-4-methoxybenzophenone.

Furthermore, 2,4-dihydroxy-2'-methylbenzophenone is a more efficient absorber than other closely related compounds:

Compound:                   Height of absorption peak
- (1) 2-hydroxy-4-methoxybenzophenone   $K_{287m\mu}=65.5$
- (2) 2-hydroxy-4-methoxy-2'-methylbenzophenone   $K_{323m\mu}=42.5$ ; $K_{284m\mu}=67$ ; $K_{322m\mu}=39.9$
- (3) 2,4-dihydroxy-2'-methylbenzophenone   $K_{287m\mu}=69.9$ ; $K_{322m\mu}=44.8$ Thus the height of the peaks which indicate efficiency of absorption for (3) are 6.5% and 5% higher than in the case of (1), and 4% and 11% higher than in the case of (2).

Additionally, 2,4-dihydroxy-2'-methylbenzophenone has a higher minimum absorption between the peaks than related compounds which also indicates its greater efficiency.

Compound:                   Height of absorption minimum
- (1) 2-hydroxy-4-methoxybenzophenone   $K_{310}\ m\mu=38.2$
- (2) 2-hydroxy-4-methoxy-2'-methylbenzophenone   $K_{308}\ m\mu=37$
- (3) 2,4-dihydroxy-2'-methylbenzophenone   $K_{310}\ m\mu=42.2$ The minimum of (3) is 11% higher than that of (1) and 11.5% higher than that of (2).

Due to the greater efficiency of 2,4-dihydroxy-2'-methylbenzophenone, a lesser amount will obtain the same degree of ultraviolet protection as a less efficient agent, thereby achieving an economic improvement.

The 2,4-dihydroxy-2'-methylbenzophenone has the following formula:

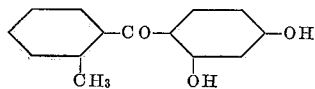

and is prepared by the following procedure:

108 grams of 85% phosphoric acid, 138 grams of polyphosphoric acid, 23 grams of o-toluic acid, 18.6 grams of resorcinol and 52 grams of zinc chloride anhydrous are stirred at 40° C. for ½ hour. Over a period of an hour at 40–45° C. there were added 29.6 grams of phosphorus trichloride. The temperature was raised to 60° C. in 2 hours and maintained for 16 hours. The reaction mass was drowned in 2.5 liters of water, stirred and cooled to 10° C., filtered, and washed with cold water. It was purified by dissolving in 280 cc. of water and 300 cc. of methyl alcohol, treated with Nuchar (activated carbon) and clarified. It was cooled to 0° C. and filtered. 30 grams of product, M.P. 127–128.6° C. were obtained.

The 2,4-dihydroxy-2'-methylbenzophenone may be used in amounts ranging from 0.01% to as much as 5.0% by weight based on the weight of the polyalkylene plastic. The polyalkylene plastics stabilized in accordance with the present invention may contain, if desired, the conventional pigments, dyes, fillers, and the like.

The following examples will illustrate the method of incorporating the 2,4-dihydroxy-2'-methylbenzophenone into the several polyalkylene plastic compositions for protection against deterioration by ultraviolet radiation. All parts given are by weight unless otherwise noted.

*Example I*

0.25% by weight of 2,4-dihydroxy-2'-methylbenzophenone was milled into a polypropylene of a melt index of 0.08 on a two-roll mill at 120–130° C. until uniform. While still hot, the milled polypropylene was then pressed through a two-roll cold mill to obtain a rough sheet of polypropylene. Several pieces were cut from the sheet and pressed out between two thin aluminum sheets on a Carver press at approximately 110° C. to a film having an approximate thickness of 6 mills. After three months' storage, the film showed no signs of blooming nor could the ultraviolet absorbing compound be rubbed off or washed out with alcohol. The films were just as transparent as one which was made in the same way without the presence of the UV absorbing compound, i.e. the 2,4-dihydroxy-2'-methylbenzophenone.

*Example II*

0.1% by weight of 2,4-dihydroxy-2'-methylbenzophenone was milled into 100% by weight of a low density polyethylene DYNH on a two-roll mill at 120° C. until uniformity was obtained. While still hot, the polyethylene was passed through a two-roll cold mill to obtain a rough sheet of polyethylene. Small pieces of the sheet were cut and pressed on a Carver press at approximately 110° C. to yield a film approximately 6 mills thick. The films were stored and examined within 72 hours for bleeding, but no bleeding was observed. The films were then exposed for 400 hours to ultraviolet light. The film containing the UV absorber was only slightly discolored and could be bent and flexed without cracking. The control film not containing the absorber was severely darkened in color and was so brittle that it cracked and broke when bent.

*Example III*

0.5 part by weight of 2,4-dihydroxy-2'-methylbenzophenone was milled with 100 parts by weight of a high density polyethylene resin commercially available under the brand name of Fortiflex A–70 (density 0.96) on a two-roll mill at 120° C. until uniformity was obtained. While still hot, the polyethylene resin was passed through a two-roll cold mill to obtain a rough sheet of polyethylene. Small pieces of the sheet were cut and pressed between two thin aluminum sheets on a Carver press at approximately 110° C. to a film having an approximate thickness of 6 mills. After three months' storage the film showed no signs of blooming and each film was just as transparent as those without the presence of the ultraviolet absorber. In addition, spectro curves of the films before and after 110 hours of exposure to a fadeometer showed no change in absorptive power.

*Example IV*

0.1% of 2,4-dihydroxy-2'-methylbenzophenone was hot milled into polybutene-1. The resulting composition was extruded into a film of 20 mills thickness, and then cut into 2½" by ½" samples. The samples and the control were exposed for 100 hours to ultraviolet light. The film containing the UV absorber was only slightly discolored and could be bent and flexed without cracking. The control film not containing the absorber was severely darkened in color and developed cracks when flexed.

*Example V*

1.5% by weight of 2,4-dihydroxy-2'-methylbenzophenone were roll milled into 10 parts by weight of polystyrene. Upon exposure to ultraviolet light for over a period of 72 hours an untreated polystyrene example showed definite yellowing and crazing whereas the treated example remained colorless and with no signs of crazing.

As previously noted, the 2,4-dihydroxy-2'-methylbenzophenone has excellent solubility in the various solvent systems and as a consequence may be incorporated into polyester dopes, paints and varnishes, etc., as will be noted from the following examples:

*Example VI*

A good spar varnish consists primarily of a combination of non-volatile ingredients which include resinous materials and oils of the drying type and volatile ingredients which include alcohols, turpentine and hydrocarbon solvents. The addition of 0.01–5.0% of 2,4-dihydroxy-2'-methylbenzophenone increases the stability of the paint and varnish through protection from deterioration of the paint and varnish per se from UV light and also gives added protection to the object coated. The problem has been to find a satisfactory UV agent which is sufficiently soluble and miscible in such formulations and which will not bloom out after the paint or varnish has dried. Most o-hydroxybenzophenone UV agents are insoluble in the usual oils found in such formulations, such as linseed oil, castor oil, tung oil and the like. 2,4-dihydroxy-2'-methylbenzophenone is readily soluble in such oils to a greater concentration than is required for protection against UV deterioration. Additionally, because of its colorlessness, there is no discoloration of light and white paints.

A spar varnish formulation is made up which consists of:

| | Parts |
|---|---|
| Phenol-formaldehyde resin | 28 |
| Tung oil | 60 |
| Castor oil | 10 |
| Linseed oil | 2 |
| n-Butanol | 5 |
| Turpentine | 10 |
| Varsol No. 1 (petroleum aliphatic solvent) | 75 |
| Petroleum naphtha | 10 |
| 2,4-dihydroxy-2'-methylbenzophenone | 3 |

After varnishing and exposing test strips of wood to sunlight for 50 weeks, a strip which contains the 2,4-dihydroxy-2'-methoxybenzophenone shows less discoloration and greater gloss than a strip treated with a control.

*Example VII*

0.25 part of 2,4-dihydroxy-2'-methylbenzophenone was dissolved in 100 parts of Polylite 8000 (alkyl resin-styrene solution) containing 1% Luperco ATC (organic peroxide composition). A casting was made between glass plates treated with mold-release agent (Dri-Film SC-87, a silicone water repellent compostion). As gasket material Tygon tubing (synthetic rubber-like material) was placed between the plates and the latter were clamped together. The alkyd-styrene resin was poured into the mold and cured as follows:

Initial oven temperature was 65° C. and the material was held at this temperature for 1 hour. The temperature was then raised to 120° C. and held ½ hour to complete the curing cycle. Polyester mold made in this way gives better protection against sunlight to fruit and meat stored behind it when it contains 2,4-dihydroxy-2'-methylbenzophenone than a casting prepared in similar manner but free of said compound.

*Example VIII*

A melt was made on a steam bath of 9 oz. of carnauba wax, 1.5 pints of turpentine, and 1.75 pints of hot water containing 2 oz. of soap. The mixture was beaten to an emulsion with a Waring blender. A similar formulation was made containing additionally 2% by weight of 2,4-dihydroxy-2'-methylbenzophenone. When applied to stained and varnished oak, the formulation containing the UV absorber gives better protection against discoloration (darkening) by light than the formulation free of absorber.

*Example IX*

160 parts of methyl acrylate, 1.7 parts of 2,4-dihydroxy-2'-methylbenzophenone, 20 parts of Triton X-200 (dispersing agent), 0.3 part of ammonium persulfate and 176 parts of water were combined and shaken to a uniform emulsion, and then gradually poured into 500 parts of water over a 2½ hour period. The material was refluxed for 3 hours. After cooling to room temperature, the product was sprayed on leather which was then pressed between plates and dried. Leather treated with this formulation shows less tendency toward yellowing than leather treated with a similar formulation in which the UV absorber is omitted.

*Example X*

A polyester resin was prepared by co-reacting 3 moles of phthalic anhydride, 3 moles of fumaric acid and 6.6 moles of propylene glycol. When esterification was substantially complete, as indicated by an acid number of 30–40, styrene was added in a sufficient amount to equal ½ of the polyester resin present. 0.02%, based on the total weight, of di-tert. butylhydroquinone was added.

To 200 parts of the above resin mixture there were added 2 parts of lauryl mercaptan as a 10% solution in styrene, 2 parts of methyl ethyl ketone peroxide and 1 part of 2,4-dihydroxy-2'-methylbenzophenone. This was poured into a suitable mold and cured in an oven by gradually heating to 250° F. and holding for 3 hours.

On exposure to light in a fadeometer for 300 hours, this sample shows less deterioration and discoloration than a similar example made without the UV absorber.

*Example XI*

89.5 parts of a copolymer prepared from 85% vinylidene chloride and 15% vinyl chloride with 7 parts of a pentaerythritol tetraester, whose ester groups had an average of 8–10 carbons, were combined with 0.5 part of sodium tripolyphosphate. 3 parts of 2,4-dihydroxy-2'-methylbenzophenone were added and moldings having a thickness of 0.1 inch were prepared and exposed to UV rays for 4 days. A similar molding in which the UV agent was excluded was likewise made and exposed to UV light. The unstabilized molding assumes a brown coloration, whereas the stabilized mold was only very slightly discolored.

*Example XII*

One part of a composition which consists of 1 mole of adipic acid, one mole of diethylene glycol and 1/16 mole of trimethylol propane was reacted with 0.47 part of tolylene diisocyanate in the presence of N-diethylaminoethanol, 1 part of ammonium oleate, 1.5 parts of sulfonates castor oil, 1.5 parts of water, 0.5 part of paraffin oil, and .005 part of 2,4-dihydroxy-2'-methylbenzophenone. After reaction was complete, a flexible foam was obtained which displayed excellent durability against deterioration on ageing.

I claim:

A polymer composition stabilized against ultraviolet light degradation consisting essentially of an unsaturated alkyd-styrene resin mixture having incorporated therein 2,4-dihydroxy-2'-methylbenzophenone in an amount ranging from 0.01% to 5% by weight of said polymer.

References Cited by the Examiner

UNITED STATES PATENTS

| 2,989,416 | 6/1961 | Standish | 252—300 |
| 3,006,887 | 10/1961 | Schoepfle et al. | 260—45.95 |
| 3,014,799 | 12/1961 | Osder | 260—94.96 |
| 3,049,443 | 8/1962 | Coleman | 252—300 |
| 3,092,663 | 6/1963 | Stanley | 260—45.95 |
| 3,134,752 | 5/1964 | Costello et al. | 260—45.95 |

WILLIAM H. SHORT, *Primary Examiner.*

L. M. MILLER, *Assistant Examiner.*